Oct. 20, 1925.
P. E. BRENEMAN
1,558,434
ATTACHABLE UPHOLSTERY FOR VEHICLE BODIES
Original Filed July 17, 1920
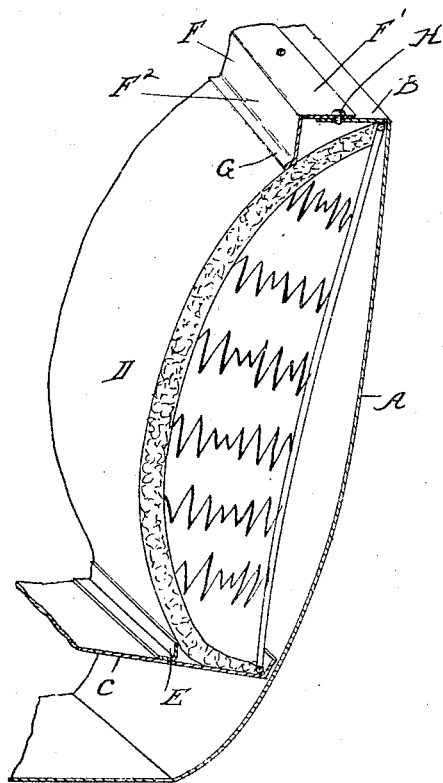
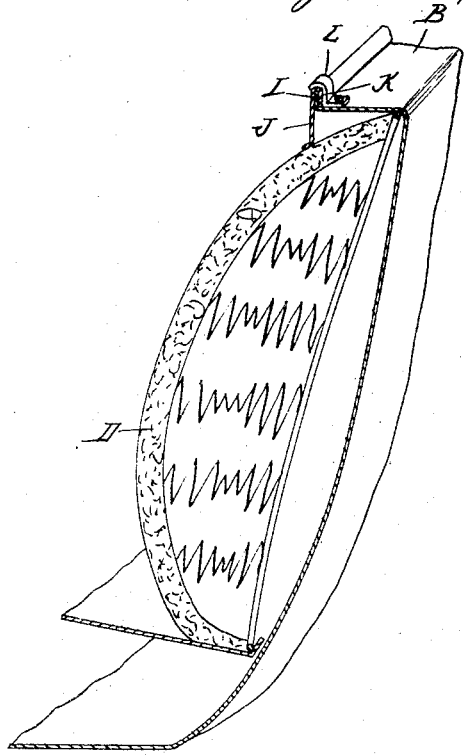
Inventor
Paul E. Breneman
By Whittemore Hulbert & Whittemore
Attorneys Patented Oct. 20, 1925.

1,558,434

UNITED STATES PATENT OFFICE.

PAUL E. BRENEMAN, OF DETROIT, MICHIGAN, ASSIGNOR TO C. R. WILSON BODY COMPANY, OF DETROIT, MICHIGAN, A CORPORATION OF MICHIGAN.

ATTACHABLE UPHOLSTERY FOR VEHICLE BODIES.

Application filed July 17, 1920, Serial No. 396,885. Renewed January 6, 1923.

*To all whom it may concern:*

Be it known that I, PAUL E. BRENEMAN, a citizen of the United States of America, residing at Detroit, in the county of Wayne and State of Michigan, have invented certain new and useful Improvements in Attachable Upholstery for Vehicle Bodies, of which the following is a specification, reference being had therein to the accompanying drawings.

The invention relates to vehicle bodies of that type in which both body and frame therefor are metallic. It is the object of the invention to provide means for securing upholstery units to the metallic body to permit of easily attaching and detaching the same. To this end the invention consists in the construction as hereinafter set forth.

In the drawings:

Figure 1 is a sectional perspective view of a portion of a metallic vehicle body, such as the seat back, showing means of securing the upholstery unit thereto;

Figure 2 is a similar view of the modified construction.

A is a portion of a metallic vehicle body such as a seat back, which at its upper edge is provided with an inturned flange B forming a border rail. C is the seat support attached to the member A, and D is an upholstery unit.

In attaching the unit D, the lower edge thereof is engaged with the seat support C and is preferably held in place by an upwardly extending flange E on said support. The upper edge of the unit D is then pressed backward beneath the flange B, as shown in Figure 1. The unit is held in this position by a strip F, which is preferably of angle cross-section having one flange F' thereof overlapping the flange B and the other flange F² projecting downward and rounded at G to form a bearing on the unit. The flange F is secured to the flange B by a series of screws H or other fastening devices arranged at intervals along the length of the strip.

With the modified construction shown in Figure 2 the flange B' at the upper end of the back portion is provided with the upwardly extending flange I. J is a strip having a return-bent flange K for embracing the upwardly extending flange I, and L are securing clips arranged at intervals and holding the return-bent flange K in engagement with the flange J. With this construction the member J will form a retainer for the upholstery unit, which may be attached or detached upon the removal of the clips L. With both constructions the unit is held from disengagement by a seat at the lower edge thereof and a retaining flange which overlaps the upper edge thereof and is detachably secured to the metallic body.

What I claim as my invention is:

1. In a metallic vehicle body, the combination with a panel portion having a flange projecting from the border thereof, of an upholstery unit engageable with said panel beneath said flange, and a detachable retaining strip secured to said flange and projecting therefrom to overlap said unit.

2. In a metallic vehicle body, the combination with a panel portion having an angle flange at the border thereof, of an upholstery unit, a seat with which the lower end of said unit may be engaged, permitting the upper end thereof to swing inward beneath said flange, and a detachable retaining strip secured to said flange and projecting therefrom to overlap said unit.

3. In a metallic vehicle body, the combination with a panel member having an angle flange projecting from the border thereof, of an upholstery unit, a seat supporting member having a bearing for receiving the lower end of said upholstery unit and permitting the upper end thereof to swing beneath said flange, and a retaining strip of angle section having one portion detachably secured to said flange and another portion extending to overlap said unit.

4. In a metallic vehicle body, the combination with a panel member provided with an angle flange at the border thereof and an upholstery unit engageable with said panel beneath said flange, of a seat supporting member adapted to receive the lower end of said unit, and flange members on said angle flange and supporting member respectively adapted to form abutments for retaining said upholstery unit, one of said flange members being detachable.

5. In a metallic vehicle body, the combination with a panel member provided with an angle flange at the border thereof, an upholstery unit engageable with said panel beneath said flange, of a seat supporting member adapted to receive the lower end of said unit and flange members on said angle flange and seat supporting member respectively, provided with angular bearing portions for engaging said upholstery unit, one of said flange members being detachable.

In testimony whereof I affix my signature.

PAUL E. BRENEMAN.